United States Patent [19]

Medley

[11] 3,927,160
[45] Dec. 16, 1975

[54] FORMAL PROFILE EXTRUSION PROCESS

[75] Inventor: Ronald D. Medley, Big Spring, Tex.

[73] Assignee: Cosden Oil & Chemical Company, Big Spring, Tex.

[22] Filed: July 17, 1973

[21] Appl. No.: 380,009

[52] U.S. Cl............ 264/45.5; 260/2.5 E; 264/46.1; 264/54; 264/101; 264/177 R; 264/DIG. 5; 264/DIG. 14
[51] Int. Cl.² .................... B29D 27/00; B29F 3/06
[58] Field of Search .... 264/48, 53, 54, 51, DIG. 14, 264/DIG. 5, 101, 177 R, 45.5, 46.1; 260/2.5 G

[56] References Cited
UNITED STATES PATENTS

| | | | |
|---|---|---|---|
| 2,941,964 | 6/1960 | Houston | 264/DIG. 5 |
| 3,200,176 | 8/1965 | Baxter | 264/DIG. 5 |
| 3,312,760 | 4/1967 | Berner | 264/101 X |
| 3,344,092 | 9/1967 | Pavuk | 264/DIG. 5 |
| 3,427,372 | 2/1969 | Berner | 264/101 X |
| 3,431,163 | 3/1969 | Gilbert | 264/48 X |
| 3,431,164 | 3/1969 | Gilbert | 264/48 X |
| 3,461,496 | 8/1969 | Winstead | 264/48 UX |
| 3,558,753 | 1/1971 | Edlin | 264/54 |
| 3,594,461 | 7/1971 | Jacob | 264/101 X |
| 3,764,642 | 10/1973 | Boutillier | 264/54 X |
| 3,804,574 | 4/1974 | Gatto | 264/DIG. 14 |
| 3,822,331 | 7/1974 | Cogliano | 264/101 X |

FOREIGN PATENTS OR APPLICATIONS

| | | | |
|---|---|---|---|
| 2,063,589 | 6/1971 | France | 264/48 |

OTHER PUBLICATIONS

"Hackh's Chemical Dictionary," Third Edition, completely revised and edited by Julius Grant, N.Y., McGraw–Hill, 1944, pp. 11–14.

Lasman, Henry R., "Blowing Agents," (reprinted from Encyclopedia of Polymer Science and Technology, Vol. 2), N.Y., John Wiley & Sons, 1965, pp. 539–540.

*Primary Examiner*—Philip Anderson
*Attorney, Agent, or Firm*—Bacon & Thomas

[57] ABSTRACT

A process for the manufacture of profiled products by extruding in a substantially non-expanded state an expandable styrene polymer composition through a die orifice having the desired profile and subsequently passing the extruded material through a sizing member wherein it expands to the desired profile and cross-section to produce an article having a porous inner cross-section and a solid, non-foamed outer layer and wherein the styrene polymer composition employed is one containing from about 1 to 4 parts of an alkali metal carbonate or bicarbonate blowing agent and from about 0.1 to 1.0 parts by weight of (hydroxy) organic acid per 100 parts by weight of styrene polymer.

5 Claims, 4 Drawing Figures

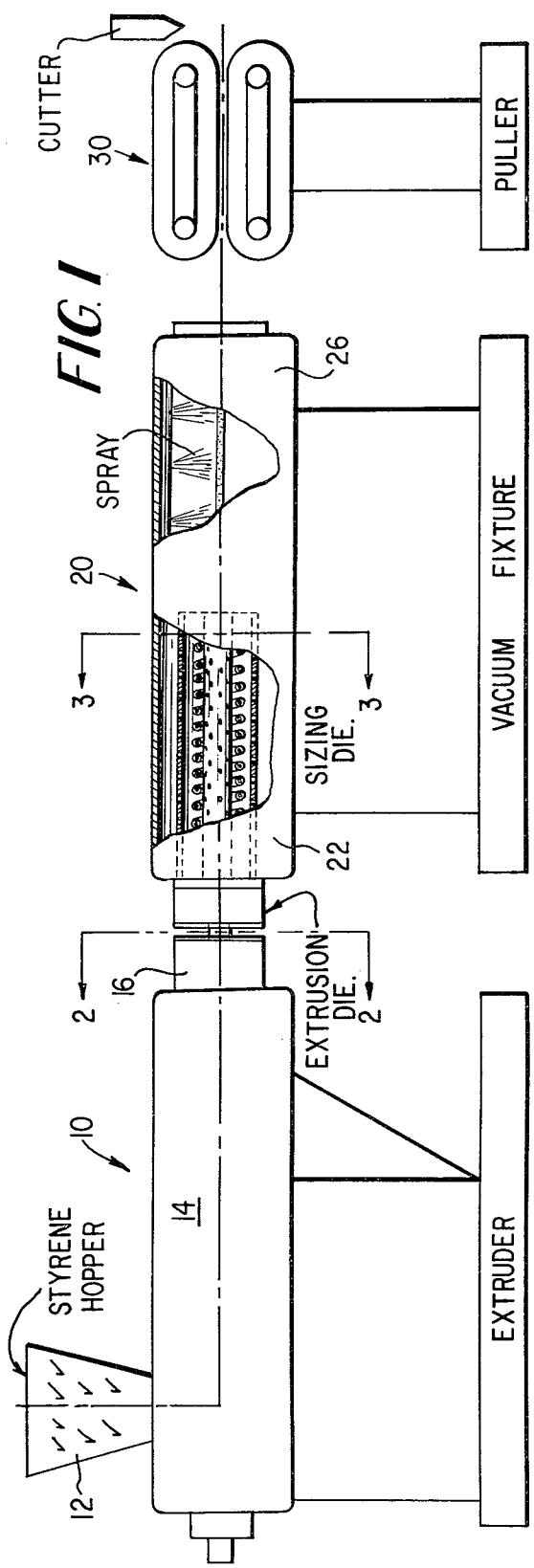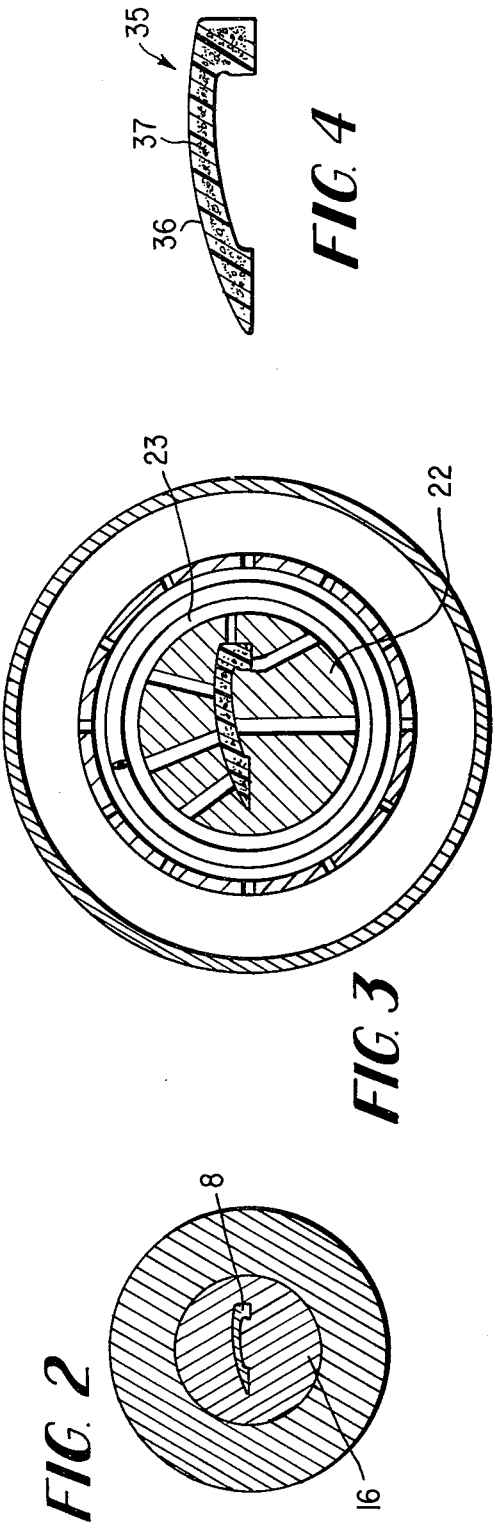

FORMAL PROFILE EXTRUSION PROCESS

BACKGROUND OF THE INVENTION

The present invention relates to the manufacture of profiled products by extrusion of expandable synthetic resinous material, and more especially pertains to the production of profiled products having non-foamed surfaces by the extrusion of styrene polymer compositions having a particular formulation.

Relatively recently processes have been developed for the production of profiled products by extrusion of certain expandable synthetic resinous materials, particularly polyvinyl chloride, polyamides, polycarbonates, polyurethanes and the like. These processes are characterized in that the synthetic resinous material is extruded through an extrusion die in a substantially unexpanded state, the extrusion die having the shape of the profile desired, and thereafter allowing the resinous material to expand in a shaping chamber which has the same profile as the extrusion die orifice and in addition is of the final desired cross-sectional area of the ultimate product to be obtained. As the resinous material expands against the walls of the shaping chamber, the outer surfaces of the profiled product thus formed take on a smooth, non-foamed character whereas the interior portion of the article cross-section remains as a light weight, porous material. Alternatively, there may also be a hollow internal cavity positioned inside the extruded article, and the process may be carried out such that the surface layer surrounding such an internal cavity is also of a non-foamed character.

As in the case with profile extrusion methods utilizing any of the above-mentioned polymeric materials, and particularly when effort is made to employ styrene polymer compositions in profile extrusion, many problems arise in achieving an extruded product having a good, smooth, relatively hard and tough non-foamed surface and in obtaining such surface without loss of desired density of the final product. Although a multitude of known expandable styrene polymer compositions, i. e., styrene polymer plus blowing agent and optionally a nucleating agent, are known for expanding polystyrene in sheet extrusion processes and other applications, it has been found that the majority of such known compositions capable of producing expanded polystyrene do not provide the desired results in terms of density and surface characteristics when utilized in profile extrusion. Moreover, because it is necessary to initially extrude the polymeric material in a substantially unexpanded state, when utilizing many of the known expandable polystyrene compositions it is necessary to introduce the blowing agent into the styrene polymer materiaal at a point well advanced through the extrusion equipment, i. e., only shortly before the material passes through the extrusion orifice. This, of course, is a disadvantageous feature which adds an additional requirement to conventional extrusion processes and requires a greater outlay for equipment.

SUMMARY OF THE INVENTION

Accordingly, it is an object of the present invention to provide a process for extruding profiled products which is capable of yielding products exhibiting excellent density and surface characteristics.

It is a further object of the present invention to provide a profile extrusion process which permits the use of conventionally designed extrusion equipment for the resinous material.

Another object of the present invention resides in the provision of a profile extrusion process wherein a particularly formulated styrene polymer composition is employed to produce profiled extrusion products having outstanding density and surface characteristics.

Thus, in accomplishing the foregoing objects, there is provided in accordance with the present invention a process for the manufacture of profiled products by the steps of extruding an expandable synthetic resinous material in substantially unexpanded condition through a die orifice having the desired profiled configuration and subsequently passing the resinous material through a sizing member having the desired profile and cross-section in which the resinous material fully expands within the confines of the sizing member to produce the desired product having a non-foamed outer surface of resinous material and a foamed interior cross-section. The particular improvement underlying the present invention resides in utilizing as the expandable synthetic resinous material a styrene polymer containing from about 1 to 4 parts by weight of an alkali metal carbonate or bicarbonate as a blowing agent and from about 0.1 to 1.0 parts by weight of a (hydroxy) organic acid per 100 parts by weight of styrene polymer. In utilizing this composition, wherein alkali metal bicarbonates are preferred and sodium bicarbonate is most preferred, it is possible to incorporate the blowing agent and the organic acid into the styrene polymer at the feed point of the extrusion equipment so that all of the ingredients are passed through the equipment together. By employing the compositions defined above in profile extrusion of styrene polymers, profiles of expanded styrene polymers having excellent density characteristics and small cell size are obtained. The small cell size in turn contributes to a tough outer surface and greater flexibility.

Other objects, features and advantages of the present invention will become readily apparent from the detailed description of the invention which follows when read in light of the accompanying drawings.

BRIEF DESCRIPTION OF THE DRAWINGS

In the drawings:

FIG. 1 is a diagramatic representation of the various stages in the profile extrusion process according to the present invention;

FIG. 2 is a cross-sectional view of the extrusion die taken along the line 2—2 of FIG. 1;

FIG. 3 is a cross-sectional view of the sizing die taken along the line 3—3 of FIG. 1; and FIG. 4 is a cross-sectional end view of a profile extrusion product manufactured in accordance with the process of the invention.

DETAILED DESCRIPTION OF THE INVENTION

The present invention is based upon the discovery that many problems associated with the profile extrusion of styrene polymer compositions may be overcome if a particular combination of blowing agent and other agents, both present within certain specific ranges, are employed in conjunction with conventional styrene polymeric material. The compositions according to the present invention when used in profile extrusion processes are advantageous in one sense because they permit the production of profiled extrusion products which manifest an extremely smooth and relatively hard and tough non-foamed surface. On the other hand, the compositions of the present invention also produce an extruded product wherein the styrene polymer is blown to the proper density and therefore exhibits the desired porous interior cross-section in the extruded article. Furthermore, it has been found, in contradistinction to those ingredients employed in most conventional profile extrusion processes, that the blowing agent and other agent in the process of the present invention may be incorporated in the styrene polymer concurrent with its introduction at the feed point of the extrusion apparatus. As a result, the styrene polymer, the blowing agent and the other agent are all passed through the extrusion apparatus concurrently, thereby resulting in more uniform distribution of the latter two ingredients throughout the mass of polymeric material.

Styrene polymers which may be employed in the process of the present invention are those which are conventionally known in connection with profile extrusion processes. Most preferred in this category are homopolymers of styrene and graft copolymers of styrene monomers with a minor percentage of an unsaturated, rubbery polymeric material, i. e., impact polystyrenes. However, also useful within the context of the present profile extrusion process are copolymers comprising a major portion of polymerized styrene monomer and a minor amount of one or more ethylenically unsaturated monomers copolymerized therewith. Examples of suitable comonomers include acrylonitrile, butadiene, acrylic acid, lower alkyl acrylates, lower alpha olefins, such as ethylene, propylene and 1-butene, acrylamide, etc. Therefore, it is to be understood that the term "styrene polymer" is used throughout the present application to encompass any of the above-delineated polymeric materials based primarily on styrene monomer.

The blowing agents to be used in the profile extrusion process according to the present invention are the alkali metal carbonates or bicarbonates, preferably the bicarbonates. The most preferred blowing agent is sodium bicarbonate. As is readily understood by those skilled in the art, the purpose of a blowing agent is to generate a gas, typically $CO_2$, within the mass of polymeric material in order to cause foaming or expansion of the material. In this respect, the alkali metal carbonates and bicarbonates are known in the art as $CO_2$-producing agents in conjunction with conventional foaming techniques wherein completely foamed products aare produced in contradistinction to the profiled extrusion products having a non-foamed surface layer as produced in accordance with the process of the present invention. Thus, the present invention is not concerned with the particular compositions per se which are to be extruded, but rather with the use of particular compositions within the context of a particularly defined profile extrusion process. However, it has been discovered that the alkali metal carbonates and bicarbonates are not entirely satisfactory as blowing agents within the profile extrusion process of the present invention when used alone, but rather that they are best employed with certain other agents and are so employed within specific concentration ranges in order to produce profiled products having the desired surface and density characteristics. Specifically, it has been found that the alkali metal carbonate and bicarbonate blowing agents must be employed within the range of about 1 to 4 parts by weight per 100 parts by weight of styrene polymer and in conjunction with a (hydroxy) organic acid.

The other agent used in conjunction with the alkali metal carbonate or bicarbonate is organic acid. It has been found that addition of from about 0.1 to about 1.0 parts of the acid per 100 parts by weight of the styrene polymer, preferably 0.2 to 0.5 parts by weight per 100 parts styrene polymer, achieves significantly improved results over those obtained without such acid. Suitable (hydroxy) organic acids include citric acid, oxalic acid, etc., with citric acid being the preferred acid. The final blown profiled styrene polymer product should have a specific gravity of between about 0.3 to 0.6, preferably 0.35 to 0.45.

The general process methods for the production of profiled, structural foamed products are well known in the art. Such processes typically involve (1) the extrusion by means of conventional extrusion equipment of a polymer composition containing a blowing agent in substantially unexpanded condition through an extrusion die orifice having the shape of the ultimately desired product, but being considerably smaller in cross-sectional area than the final product, and (2) passing this extruded stream of polymeric material to a sizing die which has both the profile and cross-sectional area of the final desired product. In the sizing die, the polymeric material is permitted to freely expand, and because of the pressure of the gases released by the blowing agent, the foamed material is forced against the walls of the sizing die to form a solid, non-foamed surface on the extruded product. After thus obtaining its final configuration, the extruded product is typically passed through a zone where it is cooled, and it is then cut into the desired length. The steps of sizing and cooling the extruded product may advantageously be carried out in a device which is connected to a source of vacuum, and temperature control in this device may be provided by the circulation of a fluid in the jacket of the device, by the provision of electrical heating elements or by direct contact with a cooling medium such as water.

Referring now to the drawings, in FIG. 1 is illustrated schematically an apparatus suitable for carrying out the process of the present invention. Designated generally by reference numeral 10 is an extrusion apparatus consisting of a feed hopper 12 for introduction of the polymeric composition into the extruder, the hopper 12 being positioned on the top surface of the rear end of the extruder, a barrel portion 14 wherein the polymeric material is heated to a molten condition, mixed thoroughly with the alkali metal carbonate or bicarbonate and the (hydroxy) organic acid and is advanced by means of a conventional extruder screw (not illustrated). The entire mass is then extruded through an extrusion die 16 located at the forward end of the apparatus. A typical configuration of the extrusion die 16 designed for the production of a conventional floor or framing molding is illustrated in FIG. 2 of the drawings wherein a cross-sectional view is presented through the extrusion die orifice from right to left in the drawings. As can be seen from FIG. 2, the polymeric material 8 is in a substantially unexpanded condition as it passes through the orifice of extrusion die 16.

Next in the chain of apparatus for the profile extrusion process is a vacuum fixture designated generally by reference numeral 20 in FIG. 1. The vacuum fixture 20 is constructed to contain in approximately the first half of its length, a sizing die 22 into which the stream of extruded thermoplastic material 8 passes immediately after its exit from the extrusion die 16. As is illustrated by FIG. 3 of the drawings, the sizing die 22 has a profile shape identical to that of the extrusion die 16, but the cross-sectional area of the cavity in the sizing die is considerably larger than that of the extrusion die in order to permit free expansion of the polymeric material. The peripheral area 23 around the sizing die 22 is maintained under vacuum, and the internal cavity 24 of sizing die 22 is in communication with this vacuum by means of a plurality of apertures in the outer surfaces of sizing die 22. The outer surfaces of sizing die 22 are also maintained at a temperature which is below the gelling point of the polymeric material so that the latter, upon being forced against the outside wall as a result of the pressure generated from within is immediately formed into a hard, solid surface. It will be appreciated that the thickness of the outer non-foamed surface of polymeric material may be regulated by controlling the temperature of the inner surfaces of sizing die 22, the higher the temperature, the thinner this non-foamed surface being. The latter half of vacuum fixture 20 is constituted by a cooling chamber 26 also maintained under vacuum. In cooling chamber 26, the final extruded product is cooled as nearly as possible to ambient temperatures in order to further solidify the solid, non-foamed surface as well as the foamed interior cross-section of the article. Cooling is suitably achieved by contacting the extruded article with a fine spray of cooling water.

Movement of the polymeric material and final extruded product through the process steps is achieved through a combination of the screw in extruder 10 and a drawing caterpillar designated by reference numeral 30 in FIG. 1. The drawing caterpillar may be employed to move the extruded article without any fear of damaging the exterior surfaces of the article as a result of the hard, non-foamed surface which is produced during the sizing and cooling steps. When the extruded article leaves the drawing caterpillar, it may be cut into any desired shape and further handled in accordance with conventional procedures.

In FIG. 4 is illustrated a cross-section of a typical section of tear drop molding 35 manufactured in accordance with the process of the invention. The molding exhibits a solid, non-foamed surface 36 (somewhat exaggerated for purposes of illustration) which surrounds the remainder of the internal cross-section formed of expanded polymeric material 37. As is well understood by persons of ordinary skill in the art, and as mentioned above, the thickness of the solid, outer surface of material can be regulated to a certain degree of selection of the temperatures at which the molten plastic material is extruded and at which the wall of the sizing die is maintained. Generally, in the case of styrene polymers, the temperature at which the material is extruded falls within the range of about 280° to about 350°F and the temperature at which the interior surface of the sizing die is maintained falls within the range of about 130° to about 175°F.

The following example is included to more fully illustrate the present invention, it being understood that the same is intended to be merely illustrative and under no circumstances limitative.

EXAMPLE

Several profile extrusion test runs were carried out to illustrate the importance of the present invention. All of the test runs were based on a standard formulation or a modification thereof. The standard formulation contained 100 parts by weight of a polystyrene mixture consisting of 85% by weight of a high impact polystyrene manufactured by Cosden Oil & Chemical Company and designated No. 825E and 15% by weight of a crystal polystyrene manufactured by Cosden Oil & Chemical Company and designated No. 550, 180 grams per 100 pounds of styrene polymer of sodium bicarbonate and 100 grams per 100 pounds of styrene polymer of citric acid. In carrying out these tests the formulations were added to the feed hopper of a 2½ inch diameter single stage vented extruder having a 4:1 compression ratio screw. The mixture of ingredients is passed through the extruder at an average temperature of about 305°F and at a feed rate of 100 pounds per hour. The thoroughly mixed ingredients, still in unexpanded condition, one forced through an extrusion die at a temperature of 310°F, the die having the shape of a tear-drop molding with an overall horizontal dimension of about 2 inches and an average vertical dimension of about ½ inch. After passing through the extrusion die, the stream of polymeric material is passed into a sizing die arranged coaxially with the extrusion die. The shape of the sizing die cross-section is identical to that of the extrusion die, but its dimensions are those of the finally desired product, being approximately 2¼ inches horizontally and having a vertical dimension of approximately 0.565 inches. The walls of the sizing die are maintained at 110°F by means of a water cooling jacket surrounding same and the interior surfaces of the sizing die also possess a multitude of small apertures which communicate with a vacuum source surrounding the entire sizing die. There exits from the sizing die a substantially solidified product having a solid, smooth, integral non-foamed outer surface of polystyrene and an inner cross-sectional area characterized as being porous. This solid product is then passed through a second chamber wherein it is cooled by being contacted with a fine spray of cold water at a temperature of 70°F. The molded product is pulled from the cooling chamber by means of a drawing caterpillar and is subsequently cut into lengths and stacked.

The following describes the particular composition employed in each test and the results with respect to cell size, characteristics of the non-foamed surface and the density of the profile obtained.

| Test No. 1 | |
|---|---|
| Formulation: | Standard |
| Specific gravity of profile: | 0.41 |
| Surface: | Good, strong |
| Cell Size: | 20 microns |
| Test No. 2 | |
| Formulation: | Same as in Test No. 1 except no citric acid used. |
| Specific gravity: | 0.40 |
| Surface: | Very poor |
| Cell size: | 100 microns |
| Other: | Gas evaluation during extrusion stuck to die |
| Test No. 3 | |
| Formulation: | Same as used in Test No. 1 above except 4 lbs per 100 lbs of styrene polymers of a color concentrate were added. The color concentrate was a 24:1 (crystal polystyrene: color concentrate) brown material manufactured by Cosden Oil & Chemical Company and designated No. 3133 C. |
| Specific gravity: | 0.42 |
| Surface: | Good, strength less than |

|  | -continued |
|---|---|
| Cell size: | without color concentrate<br>40 microns |
| Test No. 4 | |
| Formulation: | Same as used in Test No. 3 except no citric acid is used. |
| Specific gravity: | 0.70 |
| Surface: | Thick skin, poor flex. |
| Cell size: | 100 microns |
| Test No. 5 | |
| Formulation: | Same as used in Test No. 3 except amount of citric acid was reduced by one half. |
| Specific gravity: | 0.43 |
| Surface: | Good |
| Cell size: | 100 microns |
| Test No. 6 | |
| Formulation: | Same as used in Test No. 3 except amount of citric acid was doubled. |
| Specific gravity: | 0.43 |
| Surface: | Poor, gassing on surface |
| Cell size: | 40 microns |

From the above tests, it is believed apparent that the criticality of the present invention is demonstrated. These tests illustrate the importance of the presence of the citric acid and the importance of employing the proper amounts.

There has been provided in accordance with the present invention a process for the production of molded profile extrusion products having highly desirable surface and density characteristics. These outstanding results are achieved in the process of the invention by the use of a particular combination of styrene polymers, an alkali metal carbonate or bicarbonate and a hydroxy organic acid, each within a certain narrow range of concentration.

While the foregoing invention has been described with reference to several specific embodiments thereof, it is to be understood that certain modifications thereof will become readily apparent to a person of ordinary skill in the art upon reading this application. Therefore, it is intended that the proprietary rights established by means of this application be limited only by the scope of the claims which follow.

What is claimed is:

1. A process for the manufacture of profiled products having a specific gravity of from about 0.3 to 0.6 by extruding in a substantially non-expanded state an expandable styrene polymer composition through a die orifice having the desired profile and subsequently passing the extruded material through a sizing member wherein said material expands to the desired profile and cross-section to produce an article having a non-foamed outer layer of stryene polymer and a foamed interior cross-section, said styrene polymer composition consists essentially of a styrene polymer and a blowing agent consisting essentially of about 180 grams of sodium bicarbonate and from about 50 to 100 grams of citric acid per 100 pounds of styrene polymer.

2. The process of claim 1 wherein said sodium bicarbonate and said acid are incorporated into said styrene polymer at the feed point of the extrusion equipment.

3. The process of claim 1 wherein said styrene polymer is homopolystyrene.

4. The process of claim 1 wherein said styrene polymer is impact polystyrene.

5. The process of claim 1, wherein said blowing agent consists of about 180 grams of sodium bicarbonate and from about 50 to 100 grams of citric acid per 100 pounds of styrene polymer.

* * * * *